United States Patent [19]

Arnemann

[11] Patent Number: 4,643,295
[45] Date of Patent: Feb. 17, 1987

[54] APPARATUS FOR LOADING AND UNLOADING BULK MATERIALS AND/OR PIECE GOODS

[75] Inventor: Gerhard Arnemann, Hamburg, Fed. Rep. of Germany

[73] Assignee: Baas Technik GmbH, Fed. Rep. of Germany

[21] Appl. No.: 865,948

[22] PCT Filed: Jun. 9, 1983

[86] PCT No.: PCT/DE83/00106
§ 371 Date: Dec. 15, 1983
§ 102(e) Date: Dec. 15, 1983

[87] PCT Pub. No.: WO83/04405
PCT Pub. Date: Dec. 22, 1983

Related U.S. Application Data

[63] Continuation of Ser. No. 566,135, Dec. 15, 1983, abandoned.

[30] Foreign Application Priority Data

Jun. 9, 1982 [DE] Fed. Rep. of Germany ....... 3221726

[51] Int. Cl.⁴ ............................................. B65G 21/14
[52] U.S. Cl. ..................................... 198/594; 198/778
[58] Field of Search ............... 198/518, 588, 594, 598, 198/607, 658, 660, 778; 414/137–140

[56] References Cited

U.S. PATENT DOCUMENTS 4,203,512 5/1980 Ammeraal .......................... 198/594

FOREIGN PATENT DOCUMENTS 1290875 3/1969 Fed. Rep. of Germany ...... 198/778
2655381 6/1977 Fed. Rep. of Germany ...... 198/778

OTHER PUBLICATIONS

West German Utility Patent 8119173; Dec. 17, 1981.

Primary Examiner—Joseph E. Valenza
Assistant Examiner—Lyle Kimms
Attorney, Agent, or Firm—Beveridge, DeGrandi & Weilacher

[57] ABSTRACT

A loading and unloading apparatus comprises two superimposed conveyors (20, 40) formed by endless conveyor belts and spirally arranged in a vertical supporting frame (10). One conveyor (20) is fixed, while the other conveyor (40) is arranged in a supporting cage (30) rotatable about the vertical conveyor spiral longitudinal axis. The supporting cage (30) is arranged in rotary manner on an extendable and retractable supporting member section (111) of the cylindrical supporting member (11) carrying the supporting frame (10), so that the upper end (44) of conveyor (40) comes to rest above or below the lower end (25) of conveyor (20), in the case of a corresponding rotation of supporting cage (30).

3 Claims, 4 Drawing Figures

APPARATUS FOR LOADING AND UNLOADING BULK MATERIALS AND/OR PIECE GOODS

This application is a continuation of application Ser. No. 566,135, filed Dec. 15, 1983, now abandoned.

FIELD OF USE

The loading and unloading apparatus according to the invention can be used wherever it is necessary to continuously upwardly and downwardly convey bulk materials and piece goods.

PRIOR ART

An apparatus for loading and unloading particularly ships with bulk materials and/or piece goods is known from German Patent No. 1,290,875. In this loading and unloading apparatus, the rotary conveyor is positioned on the fixed conveyor, so that upwards conveying was possible without employing additional devices. However, it is necessary to provide additional devices, such as transfer rollers for downwards conveying, so that the goods to be conveyed can be transferred from the fixed conveyor onto the extendable and retractable conveyor, because the upper end of said conveyor overlaps the fixed conveyor, so that as a result of the step formed, the goods to be conveyed downwards cannot be conveyed over said step without auxiliary means.

Moreover, this apparatus does not permit the loading of ships with bulk material, because in the case of downwards conveying, the bulk material cannot be raised by the transfer rollers in the transfer area between one conveyor and the other conveyor. The desired result is also not obtained through the use of transfer plates in place of transfer rollers, because it has been found that material accumulations and blockages can then occur in the vicinity of the transfer plate, so that trouble-free downwards conveying is not possible.

PROBLEM, SOLUTION, ADVANTAGES

The present invention aims at providing an apparatus for the loading and unloading, particularly of ships, with bulk materials or piece goods, which permits an upwards and downwards continuous conveying of both bulk materials and piece goods, without additional means being required for transferring the goods to be conveyed from one conveyor onto the other conveyor and which also permits a displacement of the discharge side of the spiral conveyor to a different discharge direction, whilst permitting an adjustment of the length of the conveyor belt of the vertical conveyor.

According to the invention, this problem is solved by an apparatus for loading and unloading, particularly ships, comprising two superimposed conveyors, constructed as spiral endless conveyor belts and guided over guide pulleys in a vertical supporting frame, whereof one conveyor is fixed between the supporting frame and a central cylindrical supporting member, whilst the other conveyor is constructed in an extendable and retractable manner by rotating about the vertical supporting frame longitudinal axis, which is characterized in such a way that, the conveyor which can be rotated about its vertical spiral longitudinal axis is arranged in a supporting cage positioned below the supporting frame, said cage being mounted in rotary manner about the supporting member longitudinal axis at the bottom end of an extendable and retractable supporting member section held in the bottom area of the cylindrical supporting member of the supporting frame and which with its upper end facing the end of the fixed conveyor sectionally engages over the lower end of the fixed conveyor for upwards conveying and that after rotating the supporting cage by approximately 360°, the upper end of the conveyor rotatable with the supporting cage is located below the lower end of the fixed conveyor for downwards conveying.

An apparatus constructed in this way makes it possible to load and unload ships both with bulk material and piece goods without additional means being required, for transferring the goods to be conveyed from one conveyor to the other conveyor. For downwards conveying, the conveyor assumes a position in the supporting cage or basket, in which the upper end of the conveyor arranged in said cage comes to rest below the lower end of the fixed conveyor, so that it is not only possible to transfer piece goods, but also bulk material from the fixed conveyor to the conveyor arranged in the rotary cage. However, for an upwards conveying, the supporting cage with its conveyor is merely rotated until the upper end of the conveyor held in the cage engages over the lower end of the conveyor fixed in the supporting frame, so that after reversal of the rotation directions of the two conveyors, bulk material and piece goods can be removed from the hold of a ship and conveyed upwards to a higher discharge point, so that once again no additional means are required in the transition area between the two conveyors for this upwards conveying.

There is the further advantage, that through the possibility of rotating the supporting cage with its conveyor, the bottom end of the conveyor can be pivoted into any desired discharge or reception position. If the supporting cage, which is rotatable about the supporting member longitudinal axis, with its conveyor is locked to the supporting section extendable and retractable with respect to the supporting member of the supporting frame, height differences can be compensated and bridged by the screw thread-like rotation of the supporting member section relative to the supporting member. It is also particularly advantageous, that the rotary conveyor can be pivoted into the particular conveying direction position, without it being necessary to remove the conveyor from the vertical guide.

DEVELOPMENT OF THE INVENTION

In the further development of the invention according to claim 2, the conveyor in the supporting cage has a short spiral length compared with the fixed conveyor.

According to a further development of the invention according to claim 3, the vertical supporting member of the supporting frame is extended beyond the latter by a section, the fixed conveyor passing up to the free end of the supporting member.

It has also been found that it is particularly advantageous if, according to a further development of the invention according to claim 4, the supporting cage with the conveyor is held by means of a ball bearing slewing gear on a guide plate fixed to the bottom end of the extendable and retractable supporting member section.

In the further development of the invention according to claim 5, the supporting member can be fixed to the extendable and retractable supporting member section.

Embodiments of the invention are described hereinafter relative to the drawings.

FIG. 1 diagrammatically shows in a side view an apparatus with two spiral conveyors in the position for downwards conveying.

FIG. 2 diagrammatically shows in side view an apparatus with the two spiral conveyors in the position for upwards conveying.

BEST WAY FOR REALISING THE INVENTION

Figure 1:
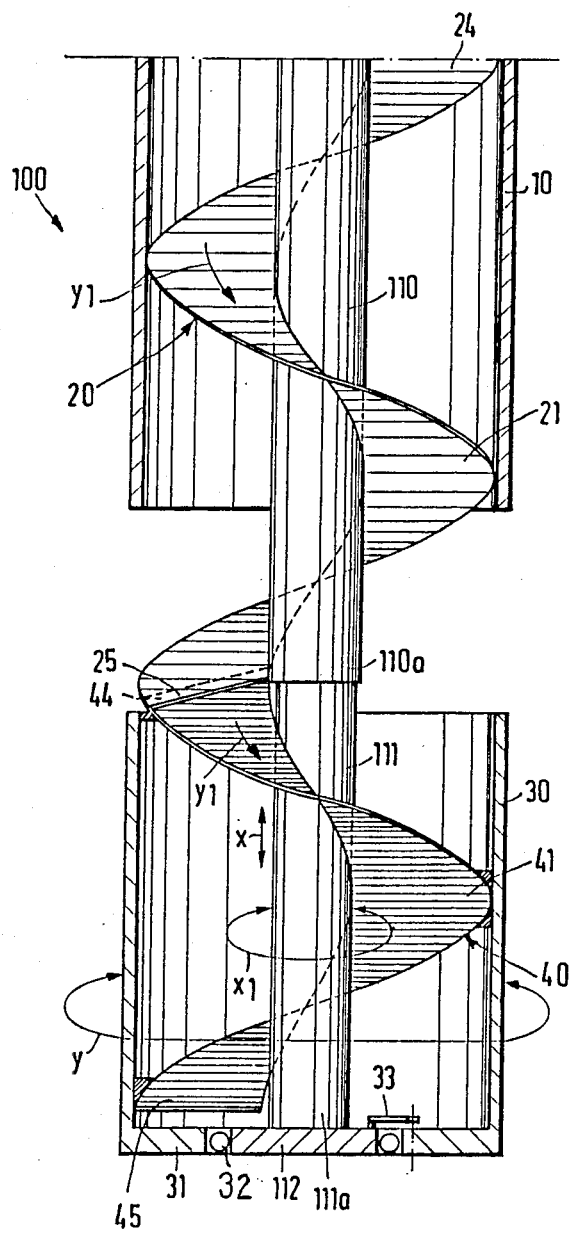
Figure 2:
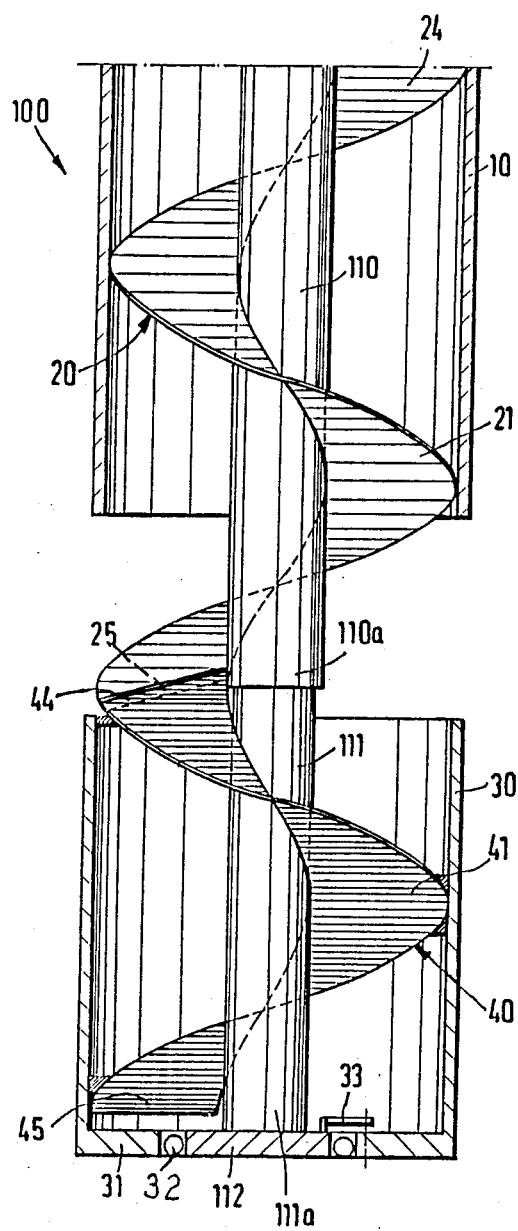

According to a preferred embodiment of FIGS. 1 and 2, the loading and unloading apparatus 100, particularly for ships, comprises a vertical supporting frame 10 with a cylindrical, tubular supporting member 110 arranged centrally therein and which is provided with an extendable and retractable supporting member section 111. This supporting member section 111, which can be extended and retracted in the direction of arrow X is guided in the inner area of supporting member 110 and is connected to a drive mechanism not shown in the drawing, which can e.g. be constructed as a lifting cylinder. However, it is also possible to provide the supporting member section 111 with a helical profiling, which is guided in a correspondingly profiled helical guide on the inner wall of cylindrical supporting member 110, so that through rotating section 111 in the direction of arrow X1, said section can be raised and lowered in spindle-like manner.

Supporting frame 10 can be fixed to a jib, which is not shown in the drawing and which is fixed in a raisable and lowerable manner to a gantry with a rotary post or column. Preferably, a parallel linkage is provided, so that during raising or lowering of the jib, supporting frame 10 always assumes a vertical position. This jib receives a conveyor belt, which is not shown in the drawing and upstream of which can be provided various supply or discharge belts, in order to supply and discharge the material conveyed via apparatus 100.

Figure 3:
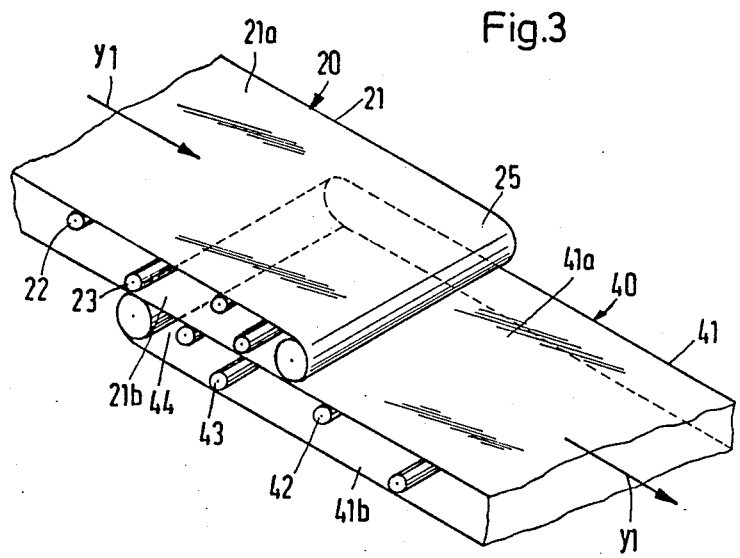
FIG. 3 shows a diagrammatic partial view of the two overlapping ends of the two conveyors for downwards conveying.

Supporting frame 10 receives a fixed, spiral conveyor, which comprises an endless conveyor belt 21 passed in spiral manner around the cylindrical supporting member 110 of supporting frame 10 with the upper strand 21a and the lower strand 21b (FIGS. 1 and 3). The helical conveyor belt 21 is guided by means of guide pulleys and driving pulleys 22, 23, which are mounted in an overhanging manner in accordance with the spiral of conveyor belt 21 on supporting member 110 and on supporting frame 10. Pulleys 22, 23 preferably conically taper in the direction of supporting member 110. The guide pulleys around which the conveyor belt 21 passes, are constructed as driving pulleys and are connected to a drive motor, which is not shown in the drawings and which is preferably arranged within the supporting member 110. However, it is also possible to drive either only the upper belt guide pulley, or only the lower belt guide pulley, or both belt guide pulleys. The rotation direction of the drive motor for the driving pulleys for the conveyor belt 21 can be changed, so that the conveyor belt can convey in both directions. In place of a conveyor belt, guided by means of guide pulleys, it is also possible to use a spirally constructed sliding belt, which is then guided over corresponding guide surfaces on supporting frame 10.

In order to ensure a reliable guidance of conveyor belt 21, the edges of the belt are slidingly guided in guide rails provided on the inner wall of supporting frame 10, but which are not shown in the drawing. The edge portions of conveyor belt 21 carry correspondingly constructed profiles, which engage in preferably approximately U-shaped guides of the supporting frame 10. The profiles can be provided on the edge portion of conveyor belt 21, or can be shaped onto the belt. However, the profiles on the inner wall of supporting frame 10 and the opposite profiles on conveyor belt 21 can also be differently constructed. The edge of conveyor belt 21 facing supporting member 110 can be additionally provided with a profile, which is guided in a guide rail provided adjacent to the upper strand of conveyor belt 21 and located on the outer wall of supporting member 110. Thus, in its section facing supporting member 110, conveyor belt 21 is only guided in its upper strand 21a and in its side facing supporting frame 10 in the upper and lower strands 21a, 21b, which ensures a reliable guidance of the spirally constructed conveyor belt 21. In place of sliding guides or in place of guide pins, it is also possible to provide guide rollers on the conveyor belts, which then roll on correspondingly profiled guide rails.

The supporting frame 10 can comprise a non-solid wall, but can also comprise a solid wall. If the supporting frame 10 is constructed in solid-walled manner, it can be externally and/or internally lined with an insulating layer, so that it is also possible to convey temperature-sensitive goods, such as e.g. bananas, because the insulating layer ensures a constant temperature within the conveyor. In cases where it is necessary to cool the goods being conveyed, or when there is a high external temperature, the solid-wall supporting frame can be equipped with cooling members for maintaining low temperatures within the conveyor.

The length of the supporting frame 10 with the spiral conveyor 20 is a function of the necessary hoisting height and/or the depth of the holds of the ships to be loaded or unloaded. In conjunction with a jib, the supporting frame 10 with its helical conveyor 20 can then be introduced as a vertical conveyor into a hold to the extent permitted by the superstructures of the ship.

In the embodiment shown in FIG. 1, the cylindrical supporting member 110 is extended by one section beyond the supporting frame 10. The spiral conveyor 20 is guided into the vicinity of the free end 110a of the supporting member 110. The top feeding or discharging end of conveyor belt 21 of spiral conveyor 20 is indicated at 24 and the bottom feed and discharge end at 25.

The supporting member section 111 extendably and retractably held on supporting member 110 carries a supporting cage 30 rotatable about the longitudinal axis of member 110 or section 111 and its diameter approximately corresponds to the diameter of supporting frame 10. At the bottom, this supporting cage 30 has a supporting plate 31 which, accompanied by the interposing of a ball bearing slewing gear indicated at 32 in FIG. 1, is held on a guide plate 112 fixed to the free end of 111a of the supporting member section 111 in such a way that the supporting cage 30 can be rotated about section 111 in the direction of arrow Y. Supporting cage 30 is open at the top. In the same way as supporting frame 10, supporting cage 30 can be constructed in solid-walled or non-solid-walled manner.

Supporting cage 30 can be secured with the extendable and retractable supporting member section 111. A correspondingly constructed locking means is indicated at 33 in FIG. 1. As a result of locking means 33, it is no longer possible for supporting cage 30 alone to rotate.

Supporting cage 30 contains a further spiral conveyor 40, which comprises a conveyor belt 41, which is constructed in the same way as conveyor belt 21 of conveyor 20. Once again, conveyor belt 41 with its upper strand 41a and its lower strand 41b is guided in spiral manner around the supporting member section 111, but is held on the supporting cage 30. For this purpose, the guide pulleys and driving pulleys 42, 43, over which the conveyor belt 41 is guided, are mounted in overhanging manner in accordance with the spiral configuration of belt 41 on the inner wall of cage 30, the pulleys 42, 43 tapering conically in the direction of section 111. The guide pulleys about which passes the conveyor belt 41, are constructed as driving pulleys and are connected to a drive motor, which is not shown in the drawing and which is preferably provided on supporting cage 30. The rotation direction of the drive motor for the driving pulleys for conveyor belt 41 can be changed, so that belt 41 can convey in both directions. In the case of conveyor 41, once again the conveyor belt 41 guided over guide pulleys can be replaced by a spirally constructed sliding belt, which is then guided over guide surfaces correspondingly provided on supporting cage 30.

The two drive means for the fixed conveyor 20 and the conveyor 40 rotatable with the supporting cage 30 are connected to a control device, which is not shown in the drawing and which ensures that the drive means are always connected in such a way that the conveyor belts 21, 41 of the two conveyors 20, 40 rotate in the same direction.

In the case of the embodiment shown in FIG. 1, the conveyor 40 in supporting cage 30 has a short spiral length compared with the fixed conveyor 20. The spiral length of conveyor 40 can, however, be selected at random. The length of the supporting cage 30 is then matched to the spiral length of conveyor 40.

The top feeding or discharge end of conveyor belt 41 of conveyor 40 arranged in supporting cage 30 is indicated at 44 and the bottom feeding or discharge end at 45 (FIGS. 1 and 2).

If the conveyor belt 40 with its supporting cage 30 assumes the position shown in FIG. 1, it is possible to downwardly convey in the direction of arrow Y1 from top to bottom, because the top end 44 of conveyor belt 41 comes to rest below the bottom end 25 of conveyor belt 21 (FIG. 3). The two conveyor belts 21, 41 are driven so as to rotate in the same sense in the direction of arrow Y1.

Figure 4:
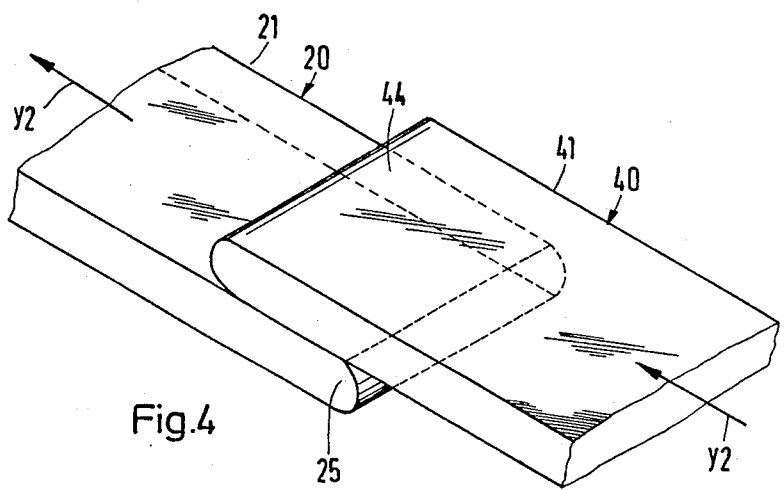
FIG. 4 shows in a diagrammatic partial view the two overlapping ends of the two conveyors for upwards conveying.

In order to be able to upwardly convey bulk material or piece goods, supporting cage 30 with its conveyor belt 41 is merely pivoted about the supporting member longitudinal axis in the direction of arrow Y until the top end 44 of conveyor belt 41 overlaps the bottom end 25 of conveyor belt 21 (FIGS. 2 and 4). If the conveyor belts 21, 41 of the two conveyors 20, 40 are then driven in rotary manner in the same sense in the direction of arrow Y2, the material being conveyed is then conveyed from bottom to top.

Although a step is formed in the transition area between the two conveyor belts 21, 41, it does not require the provision of additional transfer means in this area, so that with a corresponding setting of conveyor belt 41 with respect to conveyor belt 21, both during upwards conveying and downwards conveying, the materials being conveyed can be transferred from the feed conveyor belt to the discharge conveyor belt. As the guidance area of the facing ends 25, 45 of the two conveyor belts 21, 41 can be kept very small, only a slight height difference between the two overlapping conveyor belt ends has to be overcome by the material being conveyed during downward or upward conveying.

If the supporting cage 30 with conveyor 40 is secured on the extendable and retractable supporting member section 111, it is then possible to raise or lower in the direction of arrow Y3 cage 30 with its conveyor 40, so that height differences in the hold area can be overcome.

I claim:

1. Apparatus for loading and unloading piece goods and/or bulk material from a location such as a ship comprising a first vertically extending, central cylindrical carrier rod; an annular supporting frame encircling at least the upper portion of the length of said first carrier rod; a second vertically extending central cylindrical carrier rod rotatingly and telescopingly extending from the lower end of said first carrier rod; an annular supporting cage encircling the lower end of said second carrier rod; a first endless conveyor belt spirally positioned about said first carrier rod, extending substantially the length thereof, and supported by said first carrier rod and said supporting frame; a second endless conveyor belt spirally positioned about said second carrier rod, extending substantially the length thereof, and supported by said second carrier rod and said supporting cage; drive means for driving said first and second conveyor belts alternatively in a first conveyor direction in which piece goods or bulk material placed on the upper end of said first conveyor belt is conveyed down said first and second conveyor belts to the lower end of said second conveyor belt and in a second conveyor direction in which piece goods or bulk material placed on the lower end of said second conveyor belt is conveyed up said second and first conveyor belts to the upper end of said first conveyor belt; and locking means adapted to assume alternatively a first condition in which rotation of said second carrier rod, second conveyor belt, and supporting cage relative to said first carrier rod, first conveyor belt and supporting frame is prevented and a second condition in which such rotation is permitted; whereby with said locking means in the first locking means condition and said second conveyor belt positioned in a first conveyor belt position with the upper end thereof beneath the lower end of said first conveyor belt, said drive means can drive said first and second conveyor belts in said first conveyor direction to convey piece goods or bulk material from the upper end of said first conveyor belt to the lower end of said second conveyor belt, the piece goods or bulk material dropping off the lower end of said first conveyor belt onto said second conveyor belt, and then said locking means can be placed in the second locking means condition and said second carrier rod, second conveyor belt, and supporting cage can be rotated relative to said first carrier rod, first conveyor belt, and supporting frame to bring the upper end of said second conveyor belt out from beneath the lower end of said first conveyor belt, said first and second carrier rods can be telescoped, and the second carrier rod, second conveyor belt, and supporting cage can be rotated back to a second conveyor belt position in which the upper end of said conveyor belt is above the lower end of said first conveyor belt, and said locking means can be returned to the first locking means condition and said drive means can then be driven in said second conveyor direction to convey piece goods or bulk material from the lower end of said second conveyor belt to the upper end of said first conveyor belt, the piece goods or bulk material dropping off the upper end of said second conveyor belt onto said first conveyor belt, in either conveyor belt position with said locking means in the second locking means condition, the telescoping of said first and second carrier rods and the rotation of said second carrier rod, second conveyor belt and supporting cage combining to permit positioning of the lower end of said first conveyor belt and the upper end of said second conveyor belt for minimal dropping of piece goods or bulk material during passage from one conveyor belt to the other while retaining the lower end of said second conveyor belt and said supporting cage at the desired vertical position, said locking means then being returned to the first locking means condition to so retain said second conveyor belt and said supporting cage.

2. Apparatus as claimed in claim 20 in which said first conveyor belt has a greater length than said second conveyor belt.

3. Apparatus as claimed in claim 1 in which said first carrier rod and first conveyor belt extend beyond the lower end of said supporting frame.

* * * * *